(12) United States Patent
Mentzer

(10) Patent No.: US 6,734,897 B1
(45) Date of Patent: May 11, 2004

(54) DIGITAL IMAGING CIRCUIT AND METHOD

(75) Inventor: Ray A. Mentzer, Corvallis, OR (US)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 09/371,745

(22) Filed: Aug. 10, 1999

(51) Int. Cl.[7] .............................................. H04N 17/00
(52) U.S. Cl. ..................................................... 348/180
(58) Field of Search ................................ 348/181, 180, 348/175, 308, 302, 187; 250/208.1

(56) References Cited

U.S. PATENT DOCUMENTS

| 4,676,761 A | | 6/1987 | Poujois | |
|---|---|---|---|---|
| 4,820,222 A | * | 4/1989 | Holmberg et al. | 445/3 |
| 5,276,400 A | | 1/1994 | Denyer et al. | 324/158 |
| 5,471,515 A | | 11/1995 | Fossum et al. | 377/60 |
| 5,654,537 A | * | 8/1997 | Prater | 250/208.1 |
| 5,841,126 A | | 11/1998 | Fossm et al. | 250/208.1 |
| 6,118,482 A | * | 9/2000 | Clark et al. | 348/308 |
| 6,366,312 B1 | * | 4/2002 | Crittenden | 348/187 |
| 6,489,798 B1 | * | 12/2002 | Scott-Thomas et al. | 324/765 |

OTHER PUBLICATIONS

Mendis, S., Kemeny, S., and Fossum, E; "CMOS Active Pixel Image Sensor"; IEEE Transactions on Electron Devices, Vol 41, No. 3, Mar. 1994; pp452–453.

* cited by examiner

Primary Examiner—Wendy R. Garber
Assistant Examiner—Rashawn N. Tillery

(57) ABSTRACT

An active pixel sensor (APS) circuit which provides enhanced test and signal processing capabilities. APSs usually include pixel cells arranged in an array of rows and columns. Selectably enableable coupling conductors are provided between principal conductors in the array to permit a signal on one principal conductors to propagate to another principal conductors. The principal conductors include row, reset and column conductors. Signal propagation for testing purposes and for normal mode operation are disclosed.

24 Claims, 2 Drawing Sheets

DIGITAL IMAGING CIRCUIT AND METHOD

FIELD OF THE INVENTION

The present invention relates to digital imaging circuits and more specifically to efficient processing in such circuits in test and/or normal mode operation.

BACKGROUND OF THE INVENTION

Various types of digital imaging circuits are known in the art and they include circuits based on charge coupled devices (CCD) and active pixel sensors (APS). One difference between CCDs and APSs is that APSs include an active device such as a transistor in each pixel cell and hence their name stems from the presence of these active devices. A typical APS cell includes a photo diode and several transistors and has a reset, row and column node (see FIG. 2). While the present invention is particularly applicable to APSs, the delayed continuous signal propagation and other aspects of the present invention are applicable to other digital imaging circuits and to memory cell arrays.

APSs are typically fabricated in a semiconductive media. Each APS in a wafer must be tested for proper operation and a certain rejection ratio is expected. Many problems that cause rejection or failure are related to the integrity of the metal conductive material. Integrity issues normally arise from three areas: (1) voids in the conductive material that cause open circuits; (2) extraneous conductive material that causes shorts; and (3) corruption of vertical layers, for example, due to pinholes in insulating layers, etc.

Various metal integrity tests are currently carried out on conductors within APSs. These tests typically include individually and sequentially selecting each row in an array and then repeating this process for the reset and column conductors. This testing arrangement requires a significant amount of time to process all testing signals and necessitates a significant amount of logic to process the signals. It should be recognized that in APS circuits approximately $2/3$–$3/4$ of a die typically comprises the APS, leaving little room for decode, test and other processing circuitry. Furthermore, some conventional testing is done with analog signals that require additional analog to digital converters and programmable gain amplifiers for signal processing.

With respect to normal mode operation, the present invention provides faster signal processing than in prior art APSs, particularly with respect to the reset signal. When taking a "picture," it is necessary that the reset signal for all cells be asserted at approximately the same time (to reduce gradient across an image) and it is necessary that this signal assertion not create an unacceptable current spike. One prior art embodiment sequentially enables or disables each row of cells. Since each row takes at least three clock cycles, this requires 120 ns per row which (at 25 mHz) is 154 us for a pixel array of 1280 rows. This does not meet camera vendor specifications of 50 us or less. Another prior art embodiment sends out a global reset (or enable/disable) signal. While this satisfies the timing requirement, parasitic capacitance creates a 5 mA current spike per row resulting in a 6.4 A current spike for the array, which is unacceptable.

Thus, a need exists for asserting the reset signal for an array of pixel cells in a rapid manner that does not introduce undesired EMI.

SUMMARY OF THE INVENTION

Accordingly, it is an object of the present invention to provide an imaging circuit with an APS that provides efficient testing.

It is another object of the present invention to provide an imaging circuit with an APS that efficiently tests the integrity of row, reset and column conductors.

It is also an object of the present invention to provide an imaging circuit with an APS that provide rapid enabling/disabling of cells therein in a manner that does not generate undesirable EMI levels.

These and related objects of the present invention are achieved by use of an improved digital imaging circuit and method as described herein.

The present invention may be practiced in many embodiments. The present invention, in at least one embodiment, includes a plurality of selectably enableable coupling conductors that are provided between each of a particular type of principal conductors, such as the row, reset or column type of conductor. The coupling conductors can be enabled such that a signal propagated on to one conductor is propagated on to other like (or potentially unlike) conductors. In test mode, this arrangement may, for example, detect metal integrity faults. In operation mode, this arrangement may, for example, provide a global signal in a manner that is rapid, but does not cause an undesirable current (EMI) spike. The coupling conductors are preferably provided near or at the ends of conductors to in effectively create a continuous and temporary generally serial signal conductor that tends to be formed in a serpentine manner through an active pixel sensor array. This selectable coupling arrangement may be provided for all, some or one of the principal conductor types.

The attainment of the foregoing and related advantages and features of the invention should be more readily apparent to those skilled in the art, after review of the following more detailed description of the invention taken together with the drawings.

DETAILED DESCRIPTION

Figure 1:
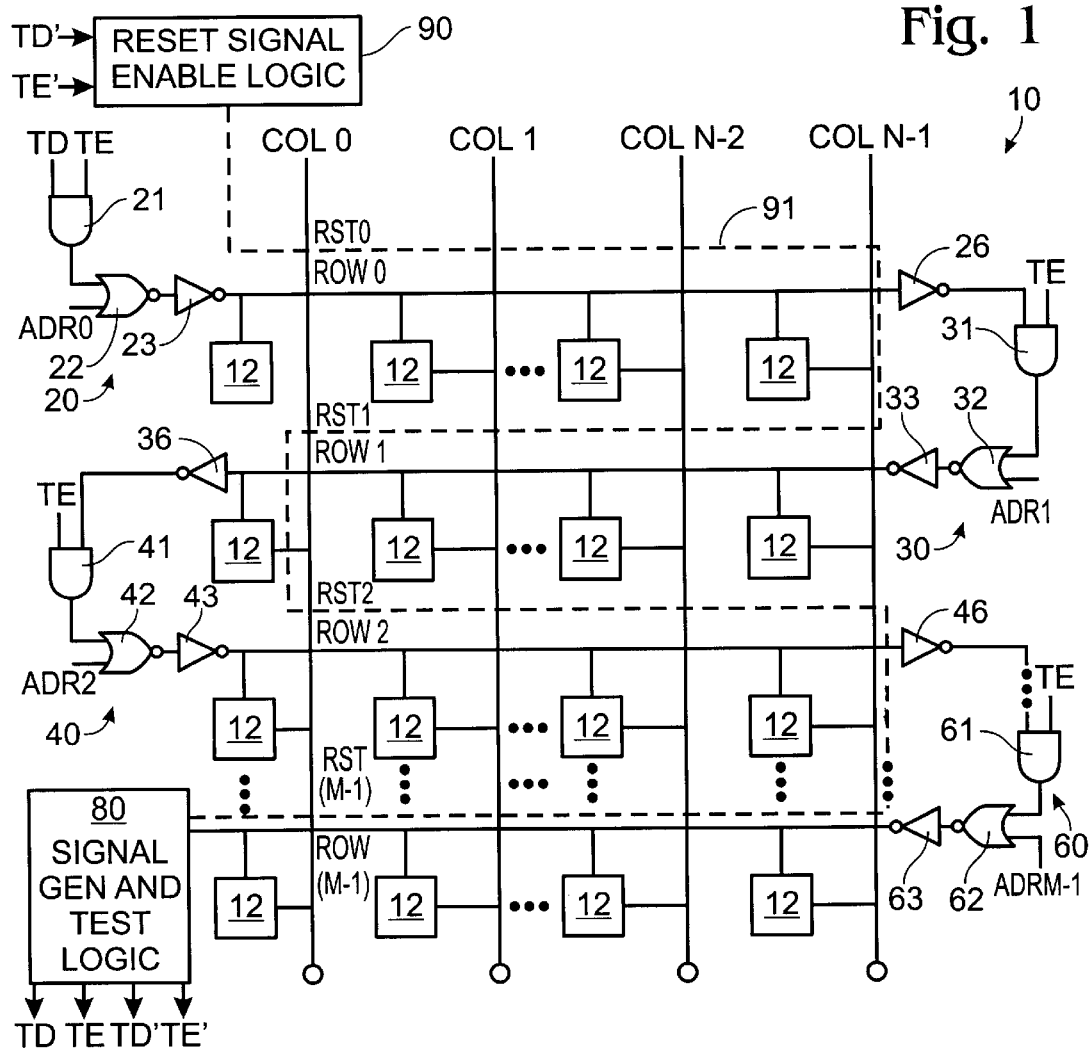
FIG. 1 is a schematic diagram of an active pixel sensor (APS) with efficient test and operation in accordance with the present invention is shown.

Referring to FIG. 1, a schematic diagram of an active pixel sensor with efficient test and operation in accordance with the present invention is shown. The sensor is preferably formed as matrix 10 that includes a plurality of active pixel cells 12 arranged in M rows and N columns. A pixel cell is provided at the intersection of each row and column. While APSs incorporating the present invention may be any size, two representative sizes are a 2M pixel APS that is 1280×1600 and a 1.3M pixel APS that is 1024×1280. Each pixel preferably has dimensions of less than 5 um×5 um.

Figure 3:
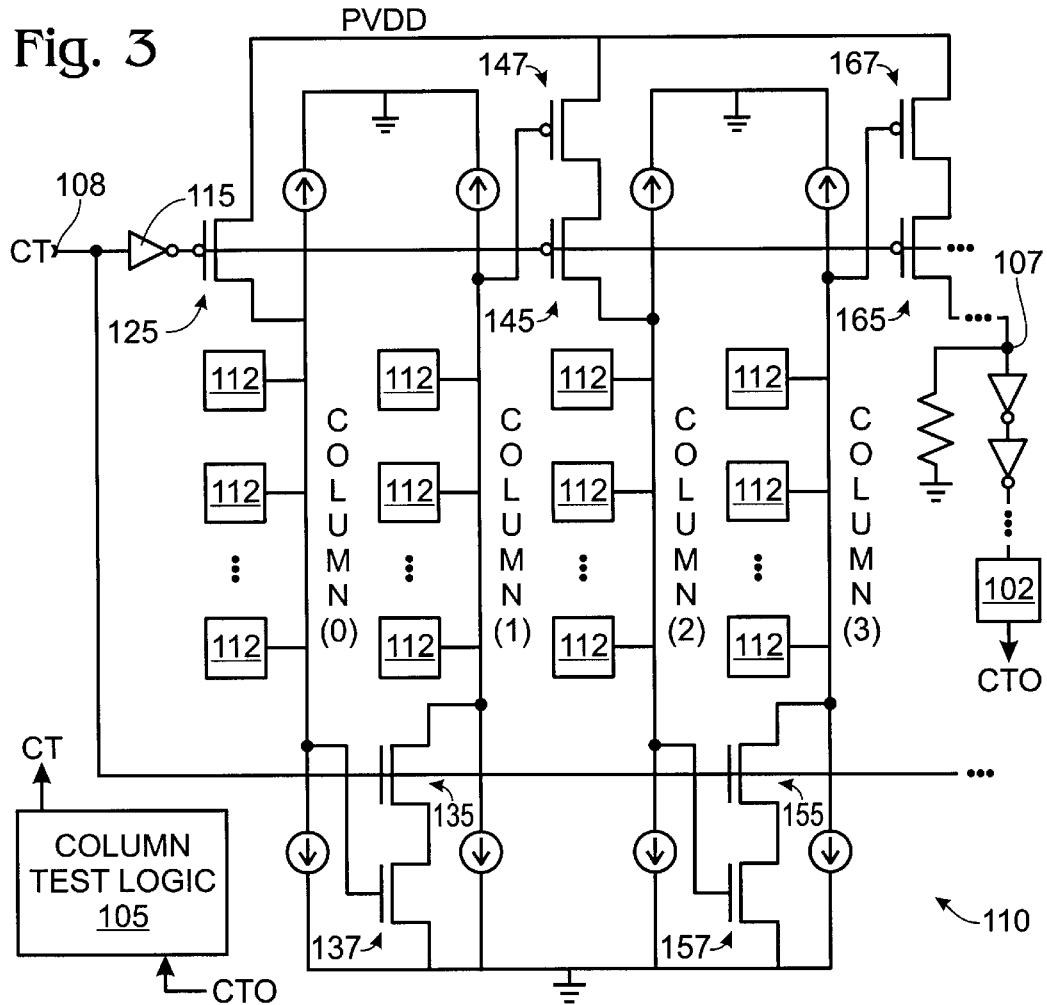
FIG. 3 is a schematic diagram of an APS having a column conductor test circuit in accordance with the present invention.
Figure 4:
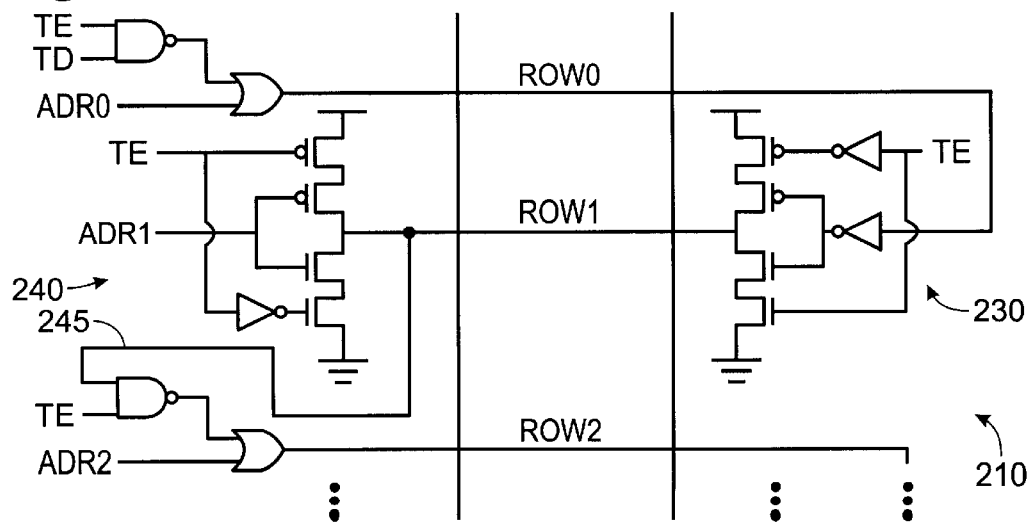
FIG. 4 is a schematic diagram alternative selectable enableable conductor arrangements (with tri-state capabilities) for row and/or reset conductors in accordance with the present invention.

FIGS. 1 and 3–4 illustrate a serpentine or like signal propagation scheme in accordance with the present invention. Features of the serpentine or like connection scheme can be used during test mode or normal mode operation. Test mode operation will be discussed first followed by normal mode operation.

Test Mode

The present invention, in one embodiment, provides selectably continuous signal conductors that incorporate the row signal conductors and the reset signal conductors. A similar arrangement is preferably provided for the column signal conductors. These arrangements test the metal integrity of the row, reset and column signal conductors, respectively. The tests preferably entail assertion of a test signal onto the first of the row, reset or column conductors. The test signal is propagated through the remainder of the conductors (of that type) and read as an output of the last conductor. Receipt of the correct test signal at the output indicates metal integrity for the type of conductor (row, reset or column) under test. The manner in which these tests are implemented is now discussed in more detail.

For row conductors, an initial test signal is preferably delivered to row0 select logic 20 that includes an AND gate 21, NOR gate 22 and inverter 23. AND gate 21 receives a test enable (TE) signal and a test data (TD) signal. The TD signal is passed through AND gate 21 to NOR gate 22. The other input of NOR gate 22 is the row0 address signal which is held low during test mode. The TD signal continues through inverter 26 to row1 select logic 30. AND gate 31 and NOR gate 32 provide the same functions as their counterparts in row0 select logic 20. NOR gate 32 passes the TD signal onto row1 through inverter 33.

The TD signal on row1 is then propagated through inverter 36 to row2 select logic 40 which includes an AND gate 41, NOR gate 42 and inverter 43. Row2 select logic 40 passes the TD signal onto row2. This serpentine pattern that propagates the TD signal back and forth down the even and odd rows, respectively, is preferably repeated until the last row(M−1) is reached. Row(M−1) select logic 60 preferably includes an AND gate 61, NOR gate 62 and inverter 63. Similar to the other row select circuit, row(M−1) select logic passes the test signal onto row(M−1).

The TE signal is preferably generated by the test signal generation and comparison logic (signal gen and test logic) 80 and delivered to each of the row select logic circuits (and counter part reset select logic circuits discussed below). The TE signal enables test mode operation. The TD signal preferably provides both logic high and logic low signals and may include serial data of different logic states. In one test, data is input to row0 select logic 20 and compared to that received from row (M−1) by test logic 80.

The row signal conductors (and the serpentine connector traces at each end) have line widths of approximately 0.5 um and these lines have a parasitic capacitance and resistance associated therewith. These parasitics produce an inherent delay. The logic components also induce delay, but this delay tends to be significantly less (e.g., a few hundred picoseconds) than that contributed by the signal trace dimensions. The delay induced by a row conductor in the APS of FIG. 1, assuming 1,600 columns, is approximately 5 ns. For an APS of 1280 rows this achieves a signal propagation time from top to bottom of 6.4 us.

FIG. 1 also shows a serpentine reset line 91 arrangement. The arrangement is shown in dash lines to distinguish it from the row lines and also so as to not crowd the drawing. It is to be understood that the same logic and signal conductors provided for row conductor test are preferably provided for reset conductor test (and for normal mode reset operation). Thus, reset select logic between each row includes an AND gate, NOR gate and inverter (and test enable and individual address signals, etc.). The test logic 80 provides a separate test enable and test data signal for the reset conductors. These signals are designated TE' and TD' respectively.

In a preferred test mode, the test of row signal conductors and reset signal conductors are carried out simultaneously. The TD and TD' signal, however, are preferably the complement of each other to increase the likelihood of detecting shorts or open circuits, e.g., bridging, etc.

Figure 2:
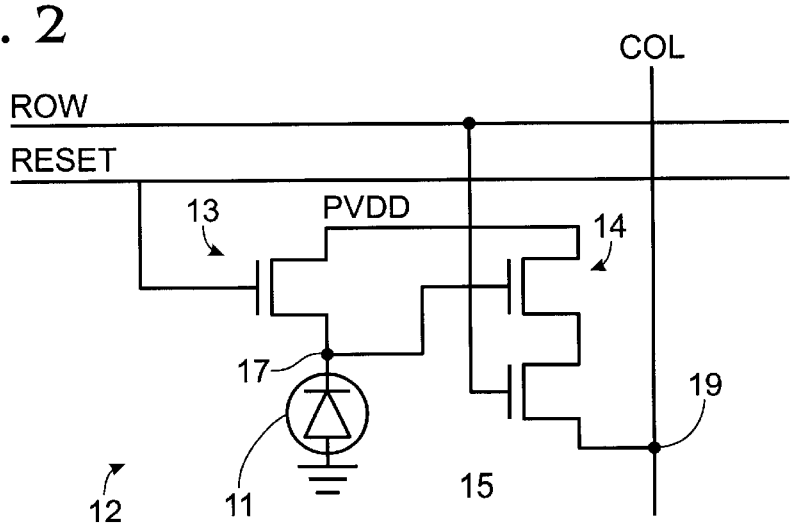
FIG. 2 is a schematic diagram of a representative pixel cell for use in the APS of FIG. 1.

Referring to FIG. 2, a schematic diagram of a representative active pixel cell for use in accordance with the present invention is shown. Cell 12 preferably includes three transistors 13–15 (which are typically n-type field-effect transistors) and a light sensitive or "photo" diode 11. Transistors 13 and 14 are coupled to $V_{DD}$ and transistor 15 is coupled to the source of transistor 14. A reset signal is applied to the gate of transistor 13 and a row select signal is applied to the gate of transistor 15.

In a typical mode of operation, the reset line is asserted high to charge the parasitic capacitance of the reversed biased photo diode to a reset level. After diode output node 17 has stabilized, the reset is pulled low, allowing photo induced charge carriers to discharge the photo diode at a rate proportional to the incident light intensity. After a specific exposure time, the row select line is asserted high allowing the voltage at node 17 to be sampled at the cell output node 19 (where the column conductor is connected), through source follower buffer transistor 14. The reset signal is again asserted high and low to reset node 17 a second time. The reset level is sampled at output 19. The difference between the voltage level at output 19 after exposure to incident light and at a reset level is proportional to the incident light intensity.

FIG. 2 illustrates the coupling of the row, reset and column conductors of any of the pixel cells 12.

Referring to FIG. 3, a schematic diagram of an APS 110 having a continuous column test conductor in accordance with the present invention. Row and reset conductors are not shown for clarity of the figure, though it is to be understood that they are preferably provided.

APS 110 includes a plurality of APS cells 112 which are preferably constructed and arranged as the APS cells 12 of APS 10 of FIG. 1. FIG. 3 illustrates a representative first four columns in an APS array.

In column mode, a test signal that is effectively test enable and test data, termed the column test (CT) signal, is provided at input node 108. The CT signal is provided to a plurality of NMOS transistors 135,155,etc., and through inverter 115 to a plurality of PMOS transistors 125,145,165. Transistors 125,135,145,155 and 165,etc., function as short circuits in test mode. Transistors 137,147,157,167,etc., permit a signal on one column to be sensed by the subsequent column.

Transistor 125 is coupled between $V_{DD}$ and column0 (col0). Transistors 135,137 are coupled between col0 and col1. Transistors 145,147 are coupled between col1 and col2, transistors 155,157 are coupled between col2 and col3, and transistors 165,167 are coupled between column 3 and the next column (not shown). The CT signal output from transistor 165 continues to propagate through the remainder of the columns.

In a preferred column test mode, CT is input at node 108 in a logic high state. This is changed to a logic low by inverter 115 and results in a logic high being asserted at the top of col0 via transistor 125. This logic high is sensed at the bottom of col0 by transistor 137 and then a low is asserted at the bottom of col1. This low is sensed at the top of col1 and a high is asserted at the top of col2. This pattern continues across the remainder of the APS and terminates with a logic high driven into the output node 107. The CT output (CTO) signal is preferably propagated to a contact pad 102 that is accessed by column test logic 105. In a preferred embodiment, contact pad 102 is commmon to the row, reset and column test isolation and selection, such as multiplexed connection, are known in the art.

FIG. 3 also illustrates current sources at the top and bottom of each column. The current sources are preferably implemented as current mirrors and permit column voltage levels to go low.

Amongst other features, FIG. 3 illustrates a digital column conductor testing arrangement. This digital testing is significantly faster than analog testing because ADCs and programmable gain amplifiers and the like are not required. It is also less consumptive of die real estate.

Referring to FIG. 4, a schematic diagram of alternative selectably enableable couplers for an APS in accordance with the present invention. FIG. 4 illustrates the first three rows of a representative APS 210. A selectable tri-state device is provided between each row or reset conductor (only the row conductors are shown). TE, TD and ADR signals are provided generally as described above, e.g., TE places the APS in test mode and TD is the test data that is propagated through the continuous conductor.

Tri-state devices 230 on the right side of the APS (only one of which is shown) receive the TE signal and are coupled to the end of the preceeding conductor (even conductors in the illustrated embodiment). Right side tri-state devices 230, which are preferably CMOS tristate devices, are coupled to the right end of the odd rows, e.g., row1 in FIG. 1. The left end of the odd rows (row1) are coupled to left side tri-state devices 240. Each left side tri-state device preferably receives the TE signal and the ADR signal for the corresponding odd rows. The left side devices 240 are also preferably configured as CMOS tri-state devices.

The left end of the odd rows is also coupled to the TE and ADR inputs of the subsequent row (row 2) substantially as shown. This pattern is preferably continued for the remainder of the APS for the row and reset conductors.

In test mode operation, the left side devices 240 are tri-stated such that a signal on the left end of an odd row propagates to the next row, for example, via conductor 245 between row1 and row2. The right side devices 230 are enabled to pass the signal on the preceeding even row to the subsequent odd row, e.g., from row0 to row1.

In normal mode operation, the converse arrangement is configured. Right side devices 230 are tri-stated so that they appear as open circuits permitting individual row signals to be propagated onto rows from the left side of the APS.

Normal Operation Mode

In normal mode processing, the selectably continuous reset signal conductors provide advantageous control over when reset signal is received at each cell, and hence the period over which image input data is integrated.

For example, in a camera embodiment with a mechanical shutter, activation of the reset signal will typically initiate "exposure" and closing of the mechanical shutter will end the exposure period. Prior art methods of sequentially addressing each row for activation result in too long of a turn on period between top and bottom rows, thereby producing a gradient in the images. Other prior art embodiments that assert a global (i.e., simultaneous) reset signal to all cells generate an unacceptable EMI current spike (as discussed in the Background of the Invention section). Reset signal enable logic 90 achieves assertion of a reset signal, for the start of imaging data integration, that propagates through the reset conductors as discussed above, experiencing approximately 5 ns of delay per individual reset conductor (i.e., per row) and delivering the reset signal to all pixel cells in the array (5 ns×1280 rows) in 6.4 us.

This arrangement provides resets in a sufficiently rapid time interval, but does not produce a disadvantageously large amount of EMI (i.e., current spikes, etc.).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An active pixel sensor circuit, comprising:

a substrate;

a plurality of active pixel cells each cell including a photodiode provided on said substrate and arranged in at least a plurality of rows;

a plurality of first signal conductors each associated with a given row and coupled to the active pixel cells of that row; and a plurality of selectably enableable coupling conductors, one provided between each of said plurality of first signal conductors, and each providing selectable coupling of the first signal conductor of one row to that of another.

2. The circuit of claim 1, wherein said selectably enableable coupling conductors are provided at alternating ends of said plurality of first signal conductors such that when said coupling conductors are enabled to conduct, a signal input to a first of said first signal conductors propagates in a generally serpentine manner through the remainder of the plurality of first signal conductors.

3. The circuit of claim 1, wherein said selectably enableable coupling conductors are provided at alternating ends of said plurality of first signal conductors such that a signal input to a first of said first signal conductors propagates in a first direction on that first of said first signal conductors, in a second direction on a second of said first signal conductors that is generally opposite of said first direction and in said first direction again on a third of said first signal conductors.

4. The circuit of claim 1, wherein at least some of said selectably enableable coupling conductors each include combinational logic and a test enable input, receipt of a correct polarity signal at said test enable input causing a signal on a preceding first signal conductor to be passed through said combinational logic to a subsequent first signal conductor.

5. The circuit of claim 1, wherein at least some of said selectably enableable coupling conductors include tri-state logic and a test enable input, receipt of a correct polarity signal at said test enable input causing a signal on a preceding first signal conductor to be passed through said tri-state logic to a subsequent first signal conductor.

6. The circuit of claim 1, wherein said first signal conductors are one of the group of signal conductors including reset signal conductors and row signal conductors.

7. The circuit of claim 1, comprising a plurality of second signal conductors each associated with a given row and coupled to the active pixel cells of that row; and a plurality of second selectably enableable coupling conductors, one provided between each of said plurality of second signal conductors, and each providing selectable coupling of the second signal conductor of one row to that of another.

8. The circuit of claim 7, wherein said first signal conductors are one of the group of signal conductors including reset signal conductors and row signal conductors, and said second signal conductors are the other of that group.

9. The circuit of claim 8, further comprising test logic coupled to said reset signal conductors and said row signal conductors, said test logic generating test data for one of the reset and row signal conductors that is the complement of test data for the other of the reset and row conductors.

10. The circuit of claim 1, wherein said first signal conductors are reset signal conductors and said circuit further includes reset signal enable logic coupled to said reset signal conductors that enables said selectably enableable coupling conductors and initiates a reset signal to start integration of input image data.

11. The circuit of claim 1, wherein said first signal conductors and said selectably enableable coupling conductors are arranged such that when a signal is input to a first of said first signal conductors and said coupling conductors are enabled, the input signal is sequentially propagated to the remaining first signal conductors in such a manner that a delay is realized before receipt of that input signal at each subsequent one of said first signal conductors.

12. The circuit of claim 11, wherein said delay is primarily a function of parasitic characteristics of the first signal conductors.

13. The circuit of claim 11, wherein said delay is less than approximately 25 ns per row.

14. The circuit of claim 11, wherein said delay is analog.

15. The circuit of claim 1, wherein said plurality of active pixel cells are further arranged in a plurality of columns and said circuit further includes:

a plurality of column conductors each associated with one of said pixel columns and coupled to the active pixel cells of that pixel column; and a plurality of selectably enableable coupling circuits, at least one provided between each of said column conductors such that a signal on one column conductor is sensed on a subsequent column conductor when the intervening coupling circuit is enabled.

16. The circuit of claim 15, wherein when said plurality of selectably enableable coupling circuits are enabled, a signal on a first of said column conductors is sensed in a substantially serpentine manner through the remainder of said columns.

17. An active pixel sensor circuit comprising:

a substrate;

a plurality of active pixel cells each cell including a photodiode provided on said substrate and arranged in at least a plurality of rows;

a selectably enableable continuous conductor that is coupled to each of said active pixel cells and arranged such that a signal input to said selectably enableable continuous conductor when enabled is propagated in a substantially serpentine manner to said plurality of active pixel cells.

18. The circuit of claim 17, wherein said selectably enableable continuous conductor includes one of the group of conductors including reset signal conductors and row signal conductors.

19. An active pixel sensor (APS) circuit, comprising:

a substrate;

a plurality of active pixel cells each cell including a photodiode provided on said substrate and arranged in at least a plurality of columns;

a plurality of column conductors each associated with one of said pixel columns and coupled to the active pixel cells of that pixel column; and a plurality of selectably enableable coupling circuits, at least one provided between each of said column conductors such that a signal on one column conductor is sensed on a subsequent column conductor when the intervening coupling circuit is enabled.

20. The APS circuit of claim 19, wherein when said plurality of selectably enableable coupling circuits are enabled, a signal on said first of said column conductors is sensed in a substantially serpentine manner through the remainder of said columns.

21. The APS circuit of claim 19, wherein each of said selectably enableable coupling circuits includes an active device.

22. The APS circuit of claim 19, further including a current source coupled to each column conductor.

23. A method of processing for an active pixel sensor circuit, comprising the steps of:

providing a plurality of active pixel cells each cell including a photodiode on a substrate that are arranged in at least a plurality of rows;

providing a plurality of first signal conductors each associated with a given row and coupled to the active pixel cells of that row; and selectably enabling coupling conductors between each of said plurality of first signal conductors such that a signal on one first signal conductor is propagated to the subsequent first signal conductor.

24. The method of claim 23, further comprising the steps of:

providing said selectably enableable coupling conductors at alternating ends of said plurality of first signal conductors;

enabling said selectably enableable coupling conductors; and progating a signal through said first signal conductors and said enabled coupling conductors in a substantially serpentine manner.

* * * * *